(12) United States Patent
Sassaman, Jr. et al.

(10) Patent No.: US 11,332,392 B2
(45) Date of Patent: May 17, 2022

(54) TREATMENT OF HIGH PEROXIDE WASTE STREAMS

(71) Applicant: EVOQUA WATER TECHNOLOGIES LLC, Pittsburgh, PA (US)

(72) Inventors: Frank L. Sassaman, Jr., Fombell, PA (US); David L. Berger, Wampum, PA (US); Stanley R. Karrs, Gibsonia, PA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 58 days.

(21) Appl. No.: 16/305,959

(22) PCT Filed: May 25, 2017

(86) PCT No.: PCT/US2017/034588
§ 371 (c)(1),
(2) Date: Nov. 30, 2018

(87) PCT Pub. No.: WO2017/210094
PCT Pub. Date: Dec. 7, 2017

(65) Prior Publication Data
US 2019/0127247 A1    May 2, 2019

Related U.S. Application Data (60) Provisional application No. 62/393,701, filed on Sep. 13, 2016, provisional application No. 62/344,640, filed on Jun. 2, 2016.

(51) Int. Cl.
*C02F 1/52* (2006.01)
*C01B 15/01* (2006.01)
(Continued)

(52) U.S. Cl.
CPC ............ *C02F 1/5245* (2013.01); *C01B 15/01* (2013.01); *C02F 1/283* (2013.01); *C02F 1/66* (2013.01);
(Continued)

(58) Field of Classification Search
None
See application file for complete search history.

(56) References Cited

U.S. PATENT DOCUMENTS 5,039,428 A    8/1991  Wentzler et al.
5,538,636 A *  7/1996  Gnann ................ C02F 1/4678
                                              204/520
(Continued)

FOREIGN PATENT DOCUMENTS

EP    0490317 A1    6/1992
EP    0659482 A1    6/1995
(Continued)

OTHER PUBLICATIONS

Machine translation of JP-2004074088-A, pp. 1-4. (Year: 2004).*
(Continued)

*Primary Examiner* — Clare M Perrin (57) ABSTRACT

A method of reducing a concentration of hydrogen peroxide from wastewater includes diluting the wastewater with water having a lower concentration of hydrogen peroxide than the wastewater to produce a diluted wastewater, contacting the diluted wastewater with a dissolved iron compound at an acidic pH to form a partially treated wastewater having a lower concentration of hydrogen peroxide than the diluted wastewater, and precipitating iron solids from the partially treated wastewater by raising a pH of the partially treated wastewater to form a neutralized partially treated wastewater.

23 Claims, 5 Drawing Sheets

(51) Int. Cl.
*C02F 1/66* (2006.01)
*C02F 1/72* (2006.01)
*C02F 1/28* (2006.01)
*C02F 1/70* (2006.01)
*C02F 9/00* (2006.01)
*C02F 1/24* (2006.01)
*C02F 101/34* (2006.01)
*C02F 1/44* (2006.01)
*C02F 101/10* (2006.01)
*C02F 103/34* (2006.01)
*C01B 15/013* (2006.01)
*C02F 1/58* (2006.01)

(52) U.S. Cl.
CPC .............. *C02F 1/70* (2013.01); *C02F 1/722* (2013.01); *C02F 1/725* (2013.01); *C02F 9/00* (2013.01); *C02F 1/24* (2013.01); *C02F 1/444* (2013.01); *C02F 1/705* (2013.01); *C02F 2101/10* (2013.01); *C02F 2101/34* (2013.01); *C02F 2103/346* (2013.01); *C02F 2209/005* (2013.01); *C02F 2209/06* (2013.01); *C02F 2301/046* (2013.01); *C02F 2303/18* (2013.01); *C02F 2305/023* (2013.01); *C02F 2305/026* (2013.01)

(56) References Cited

U.S. PATENT DOCUMENTS

| | | | |
|---|---|---|---|
| 5,632,885 A | 5/1997 | Yamasaki et al. | |
| 5,635,078 A * | 6/1997 | Yan | C02F 1/281 |
| | | | 210/763 |
| 6,153,108 A | 11/2000 | Klock et al. | |
| 6,238,571 B1 * | 5/2001 | Olmez | C02F 1/5245 |
| | | | 210/722 |
| 7,166,227 B2 * | 1/2007 | Karlsson | C02F 11/14 |
| | | | 210/712 |
| 7,303,671 B2 | 12/2007 | Srinivasan et al. | |
| 2002/0003116 A1 * | 1/2002 | Golden | C02F 1/5245 |
| | | | 210/759 |
| 2015/0191379 A1 | 7/2015 | Dournel | |

FOREIGN PATENT DOCUMENTS

| | | |
|---|---|---|
| EP | 2500323 A1 | 9/2012 |
| JP | 59162994 A * | 9/1984 |
| JP | S59162994 A | 9/1984 |
| JP | 2002316173 A | 10/2002 |
| JP | 2004074088 A * | 3/2004 |
| JP | 2004074088 A | 3/2004 |
| WO | 2013151654 A1 | 10/2013 |

OTHER PUBLICATIONS

Machine translation of JP-59162994-A, pp. 1-3. (Year: 1984).*
H. Yoshino et al., "Simultaneous Removal of Nitrate, Hydrogen Peroxide and Phosphate in Semiconductor Acidic Wastewater by Zero-Valent Iron," Journal of Environmental Science and Health, Part A, Toxic Hazardous Substances and Environmental Engineering, vol. 49, No. 9, May 5, 2014.
Supplementary European Search Report in Corresponding EP 17 80 7276, dated May 23, 2019.
Thomas, Shane, "Written Opinion of the International Searching Authority", International Application No. PCT/US2017/034588, dated Aug. 16, 2017, 10 pages.
Thomas, Shane, "International Search Report", International Application No. PCT/US2017/034588, dated Aug. 16, 2017, 3 pages.
Nickita-Etienne, Athina, "International Preliminary Report on Patentability", International Application No. PCT/US2017/034588, dated Dec. 4, 2018, 11 pages.

* cited by examiner

TREATMENT OF HIGH PEROXIDE WASTE STREAMS

FIELD OF TECHNOLOGY

Aspects and embodiments disclosed herein relate to systems and methods of reducing concentrations of hydrogen peroxide and, optionally, organic contaminants in wastewater.

SUMMARY

In accordance with an aspect, there is provided a method of reducing a concentration of hydrogen peroxide in wastewater. The method comprising diluting the wastewater to produce a diluted wastewater, contacting the diluted wastewater with a dissolved iron compound at an acidic pH to form a partially treated wastewater having a lower concentration of hydrogen peroxide than the diluted wastewater, and precipitating iron-containing compounds from the partially treated wastewater by raising a pH of the partially treated wastewater to form a neutralized partially treated wastewater.

In some embodiments, the method further comprises utilizing at least a portion of iron-containing compounds precipitated from the partially treated wastewater as a source of the dissolved iron compound. The method may further comprise contacting the diluted wastewater with the dissolved iron compound at the acidic pH in a first reaction tank, precipitating the iron-containing compounds from the partially treated wastewater in a second reaction tank, and recycling the precipitated iron-containing compounds from the second reaction tank to the first reaction tank.

In some embodiments, diluting the wastewater includes diluting the concentration of hydrogen peroxide in wastewater to less than about 2.2 wt % prior to introducing the diluted wastewater into the first reaction tank.

In some embodiments, the method comprises contacting the diluted wastewater with the dissolved iron compound at the acidic pH in a first reaction tank, precipitating the iron-containing compounds from the partially treated wastewater in a second reaction tank, and diluting the wastewater with solids lean effluent from the second reaction tank. Diluting the wastewater may include diluting the concentration of hydrogen peroxide in wastewater to less than about 2.2 wt % prior to introducing the diluted wastewater into the first reaction tank.

In some embodiments, the method further comprises removing residual hydrogen peroxide from the partially treated wastewater by treating the partially treated wastewater with catalytic activated carbon to form a treated water. The method may further comprise diluting the partially treated wastewater with a portion of the treated water prior to treating the partially treated wastewater with the catalytic activated carbon. Diluting the partially treated wastewater may include diluting the partially treated wastewater to a hydrogen peroxide concentration of less than about 0.1 wt % prior to treating the partially treated wastewater with the catalytic activated carbon. The method may comprise diluting the wastewater with a portion of the treated water.

In some embodiments, the method further comprises introducing the partially treated wastewater into a microfilter concentration tank and periodically filtering a portion of the partially treated wastewater from the microfilter concentration tank through a microfilter. The method may further comprise recycling microfilter concentrate separated from the partially treated wastewater by the microfilter to the microfilter concentration tank. The method may further comprise diluting the wastewater with a portion of filtrate produced from the partially treated wastewater in the microfilter.

In accordance with another aspect, there is provided a system for removing hydrogen peroxide from wastewater. The system comprises a first reaction tank having an inlet fluidly connectable to a source of the wastewater, a source of dilution water having a lower concentration of hydrogen peroxide than the wastewater in fluid communication with the inlet of the first reaction tank, a source of ferrous salt in fluid communication with the first reaction tank, a source of acid in fluid communication with the first reaction tank; a second reaction tank having an inlet in fluid communication with an outlet of the first reaction tank, and a source of a base in fluid communication with the second reaction tank.

In some embodiments, the system further comprises a recycling system configured to recycle iron containing compounds from the second reaction tank to the first reaction tank. The system may further comprise a control system configured to regulate addition of the ferrous salt and recycle of the iron containing compounds to the first reaction tank maintain a dissolved iron concentration of between about 2 g/l and about 6 g/l in the first reaction tank. The control system may be further configured to regulate addition of the acid to the first reaction tank to maintain a pH of between about 1 and about 3 in the first reaction tank. The control system may be further configured to regulate addition of the base to the second reaction tank to maintain a pH of between about 6 and about 8 in the second reaction tank.

In some embodiments, the system further comprises a water recycling system configured to recycle solids lean effluent from the second reaction tank to the inlet of the first reaction tank, the solids lean effluent forming at least a portion of the dilution water.

In some embodiments, the system further comprises a microfilter concentration tank having an inlet in fluid communication with an outlet of the second reaction tank. The system may further comprise a solids/liquid separation unit having an inlet in fluid communication with an outlet of the microfilter concentration tank. The system may further comprise a concentrate recycle system configured to recycle solids separated from the neutralized partially treated wastewater in the solids/liquid separation unit to the microfilter concentration tank.

In some embodiments, the system further comprises a filtrate recycle system configured to recycle filtrate formed from the neutralized partially treated wastewater in the solids/liquid separation unit to the inlet of the first reaction tank. The system may further comprise a filtrate holding tank in fluid communication between the solids/liquid separation unit and the inlet of the first reaction tank, the filtrate holding tank including a first outlet in fluid communication with the first reaction tank and a second outlet in fluid communication with a discharge stream that discharges liquid from the system.

In some embodiments, the system further comprises a vessel including catalytic activated carbon having an inlet in fluid communication with an outlet of the second reaction tank. The system may further comprise a dilution vessel fluidly disposed between the inlet of the vessel including the catalytic activated carbon and the outlet of the second reaction tank to form diluted partially treated wastewater from the partially treated wastewater. The system may further comprise a water recycle line configured to recycle at least a portion of treated water formed from the diluted partially treated wastewater in the vessel including the catalytic activated carbon to the dilution vessel. The system may further comprise a control system configured to regulate the recycle of the portion of the treated water to the reaction tank to form the diluted partially treated wastewater with a hydrogen peroxide concentration of less than about 0.1 wt %. The system may further comprise a water recycle line configured to recycle at least a portion of treated water formed from the diluted partially treated wastewater in the vessel including the catalytic activated carbon to the inlet of the first reaction tank.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various industrial processes produce waste water including high concentrations of hydrogen peroxide ($H_2O_2$), and, in some instances accompanied by one or more organic contaminants. As regulations regarding permissible contaminant levels in wastewater discharge are becoming increasingly tighter, it has become increasingly more important to implement processes for removing $H_2O_2$ and other contaminants from industrial wastewater.

In one particular example, in chemical mechanical polishing (CMP) planarization processes used in the semiconductor fabrication industry, a polishing slurry composed of an oxidant, an abrasive, complexing agents, and other additives is used with a polishing pad to remove and/or etch semiconductor wafers during the manufacturing process, for example, to remove excess copper from the wafers. Silicon, copper, and various trace metals are removed from the silicon structure via the polishing slurry. The chemical/mechanical slurry is introduced to the silicon wafer on a planarization table in conjunction with polishing pads. Oxidizing agents and etching solutions are introduced to control the removal of material. Deionized water rinses often are employed to remove debris from the wafer. Ultrapure water (UPW) from reverse osmosis (RO) and demineralized water also can be used in the semiconductor fabrication facility tool to rinse the silicon wafer.

An oxidizer such hydrogen peroxide ($H_2O_2$) typically is used to help dissolve copper from the semiconductor wafers. Accordingly, hydrogen peroxide at a level of about 300 ppm (0.03 wt %) and higher can be present in the polishing slurry wastewater.

The wastewater containing hydrogen peroxide should be treated prior to discharge. Catalytic carbon may be used to remove hydrogen peroxide from wastewater providing the concentration of hydrogen peroxide is below about 1,000 mg/l (0.1 wt %). If, however, the concentration of hydrogen peroxide in wastewater is greater than about 1,500 mg/l (0.15 wt %) or about 2,000 mg/l (0.2 wt %), catalytic carbon is not typically used to remove the hydrogen peroxide since large volumes of oxygen may be generated which could cause a potential run-away reaction. Also, venting large volumes of oxygen can be problematic.

In some instances, the wastewater from semiconductor fabrication plants or other industrial sources including high levels of hydrogen peroxide, for example, from about 1 wt % up to about 22 wt % hydrogen peroxide, may also include organic compounds, for example, alcohols and/or ammonium salts which should also be treated prior to discharge. These organic compounds may be present in the wastewater at levels from about 0.01 wt % up to about 1 wt %.

Figure 1:
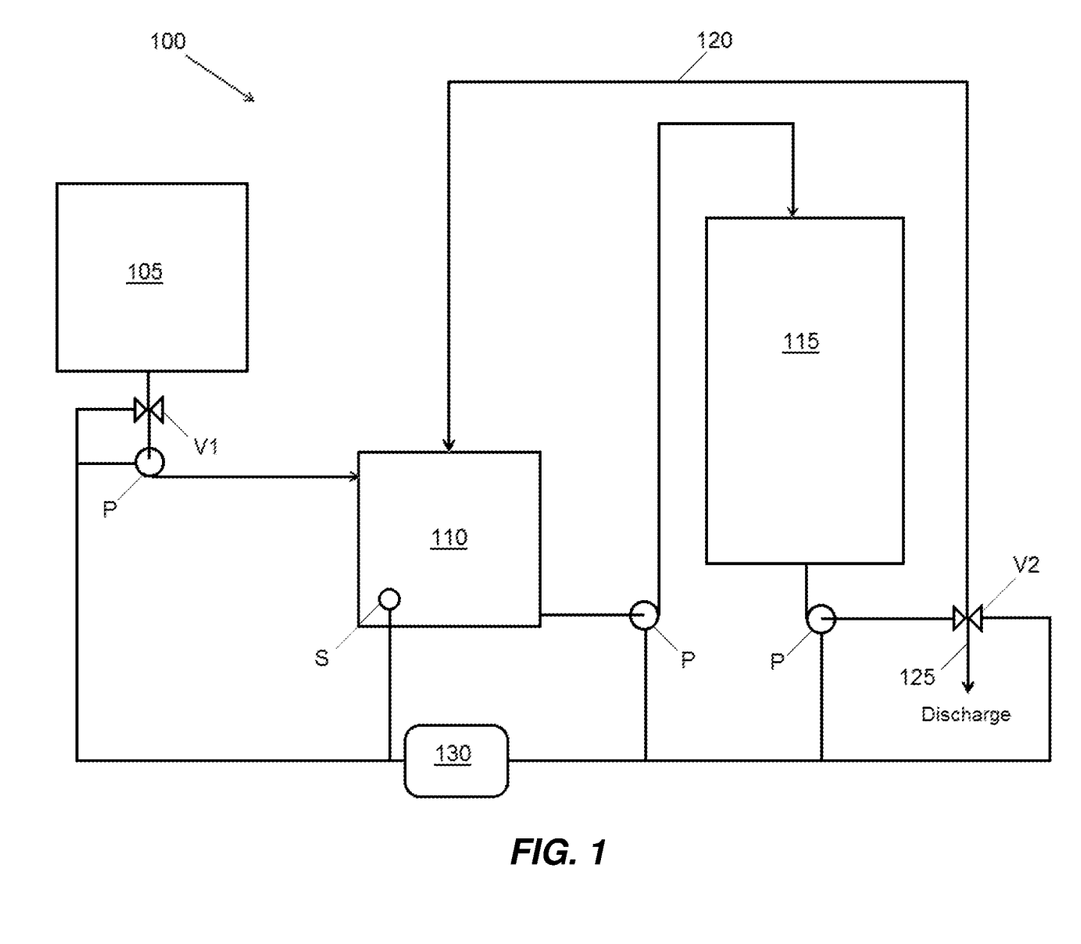
FIG. 1 is a schematic diagram of an embodiment of a system for removing hydrogen peroxide from wastewater.

In one embodiment, a system as illustrated in FIG. 1, indicated generally at 100, may be used to treat wastewater including high levels of hydrogen peroxide. In this example, a source of wastewater 105 produces a wastewater feed including 22 wt % of hydrogen peroxide at three gallons per minute (gpm). Approximately 660 gpm of treated water with a low concentration of hydrogen peroxide (e.g., approximately 20 mg/l (0.002 wt %) or less) is added to the three gpm of wastewater, for example, in blending tank 110 thus diluting the hydrogen peroxide to approximately 1,000 mg/l (0.1 wt %). This diluted hydrogen peroxide solution is then fed to a catalytic carbon column 115 which will remove the hydrogen peroxide down to approximately 20 mg/l (0.002 wt %) or less. Residence time of the wastewater in the catalytic carbon column may be between about 10 minutes and about 30 minutes, for example, about 15 minutes. The effluent from the catalytic carbon column 115 will be split into two streams. The majority (e.g, about 660 gpm) is sent through recycle line 120 to be used to dilute additional wastewater including high concentrations of hydrogen peroxide while the remainder (e.g., three gpm) is discarded or discharged through discharge line 125. This system 100 may be used to treat hydrogen peroxide contaminated wastewater where there are few organic compounds present in the wastewater, for example organic compounds at concentrations below acceptable discharge limits. Various pumps P and valves V1, V2 (ball valves, there-way valves, etc.) may be utilized to control the flow of liquid through the system components. In some embodiments, the concentration of the hydrogen peroxide is monitored, for example, either with periodic samples taken and analyzed by titration or otherwise, or with a hydrogen peroxide sensor S disposed in the blending tank 110, downstream of the catalytic carbon column 115, or in or connected to piping of the system 100. The amount of effluent used to dilute the wastewater may be adjusted by a controller 130, for example, a standard computer with appropriate control programming, an application specific integrated circuit (ASIC) or other form of controller known in the art. The controller 130 may be a single unit or may include multiple distributed control unit components which may be in communication with one another. The amount of effluent used to dilute the wastewater may be adjusted to maintain the concentration of hydrogen peroxide in the diluted wastewater entering the catalytic carbon column 115 at about 1,000 mg/l (0.1 wt %) or below. During startup when the recirculation loop is empty, dilution water from an external source may be added to the blending tank 110 or other portion of the recycle loop including the blending tank 110, catalytic carbon column 115, and associated piping.

Figure 2:
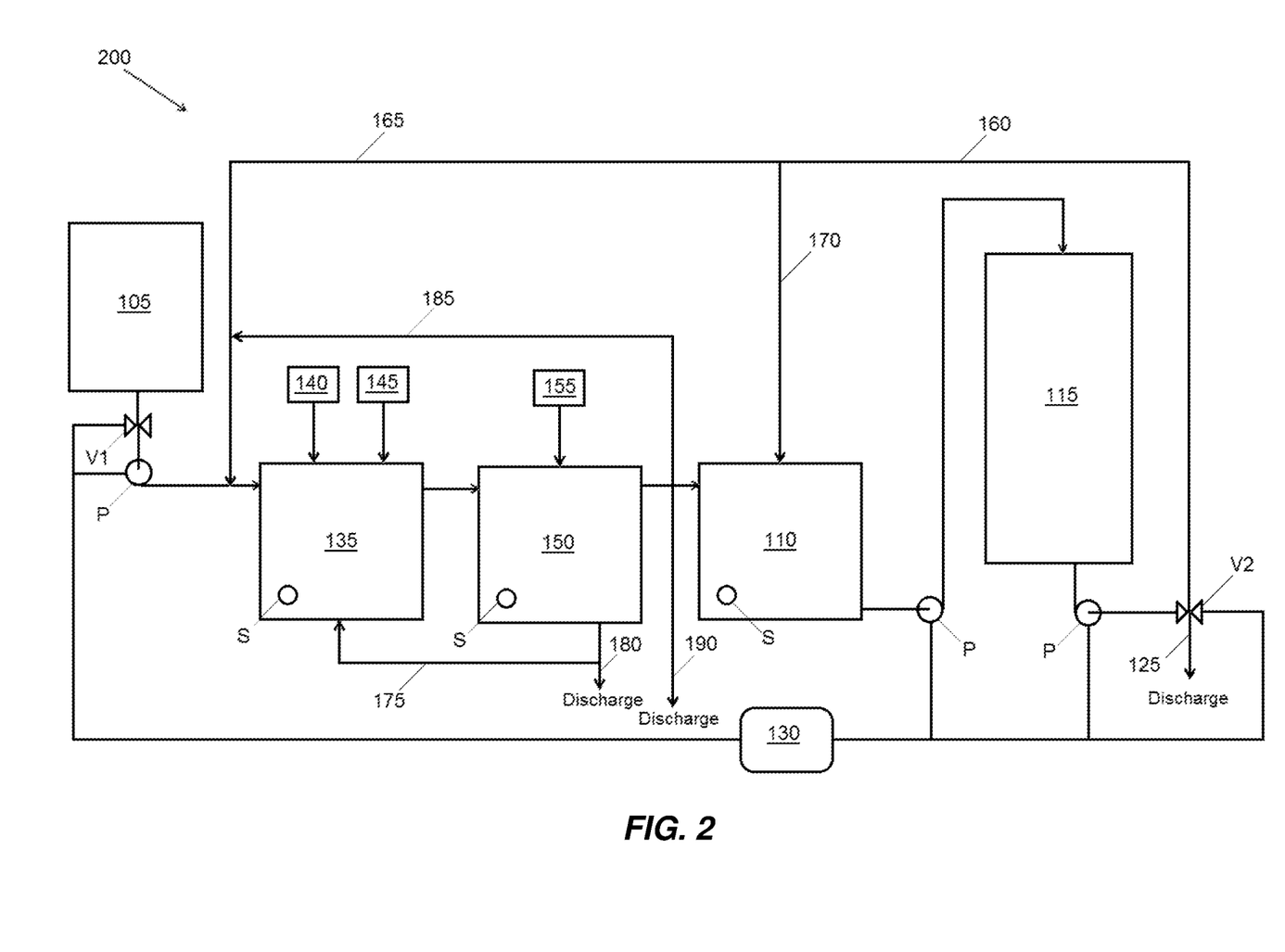
FIG. 2 is a schematic diagram of an embodiment of a system for removing hydrogen peroxide and, optionally, organic contaminants from wastewater.

In another embodiment, indicated generally at 200 in FIG. 2, in additional to high concentrations of hydrogen peroxide, the wastewater contains organic contaminants. The wastewater may contain from about 0.01 wt % to about 2 wt %, or about 1 wt % of various organic compounds. In one example, the waste stream is fed to the system from the source of wastewater 105 at a flow rate of three gpm. The wastewater is diluted so that the flow rate reaches approximately 33 gpm or a flow rate such that the wastewater includes a hydrogen peroxide concentration of less than about 22 g/l (2.2 wt %) prior to or after entering a reaction tank 135 with dilution water having a lower concentration of hydrogen peroxide than the influent wastewater. The dilution water may be effluent or treated wastewater from a downstream unit operation, for example, a catalytic carbon column 115 and/or a solids/liquid separation unit 150 (discussed below).

In the reaction tank 135, a ferrous salt and an acid are added from source of ferrous salt 140 and source of acid 145, respectively, to create conditions which will support the formation of hydroxyl ions in the reaction tank 135. The pH in the reaction tank 135 may be adjusted or maintained at a pH of between about 1 and about 3 or about 2 by addition of the acid. The concentration of dissolved iron in the reaction tank 135 may be adjusted to or maintained at between about 2 g/l and about 6 g/l or greater than or equal to about 3 g/l by addition of the ferrous salt and/or recycle of ferric hydroxide from a downstream solids separation unit, discussed below. Residence time of diluted wastewater in the reaction tank 135 may be from about 30 minutes to about four hours or about two hours. The ferrous salt may include or consist of, for example, ferrous sulfate. The acid may include or consist of, for example, sulfuric acid. The majority of the organic compounds will be destroyed in the reaction tank 135 or reactor. The destruction of the organic compounds may be accomplished through a Fenton's reaction. The Fenton's reagent used for the destruction of the organic compounds in the reaction tank 135 may be formed by adding about 10 parts of peroxide to about 1 part of ferrous iron (e.g., ferrous sulfate) for about every 0.3 parts of organic compounds. The Fenton's reaction may also decompose at least a portion of the hydrogen peroxide in the diluted wastewater in the reaction tank 135. The Fenton's reaction may occur in accordance with the chemical equations:

$$Fe^{2+} + H_2O_2 \rightarrow Fe^{3+} + HO\bullet + OH^-$$

$$Fe_{3+} + H_2O_2 \rightarrow Fe^{2+} + HOO\bullet + H^+$$

The hydroxyl and hydroperoxyl radicals may react with and break down the organic contaminants in the diluted wastewater into primarily carbon dioxide and water.

During the destruction of the organic compounds in the reaction tank 135, a byproduct will be formed which comprises an excess of dissolved iron. To remove the iron, a neutralization step and solids separation (e.g., settling) step is performed on effluent from the reaction tank 135. The solids separation is accomplished by dissolved air flotation (DAF), filtration, microfiltration, or clarification with a solids separation unit 150. The pH in the solids separation unit 150 may be adjusted or maintained at a pH of between about 6 and about 8 or about 6.8 by the addition of a base, for example sodium hydroxide from a source of base 155. Controller 130 may receive signals indicative of pH in the solids separation unit from a sensor S and control the addition of the base to achieve the desired pH in the solids separation unit. The higher pH will reduce additional peroxide if some is still remaining in the partially treated wastewater in the solids separation unit 150.

After the solids separation, a flow of solids lean effluent out of the solids separation unit 150 at a flow rate of, for example, about 33 gpm will be combined with about 570 gpm of water recycled from the hydrogen peroxide treatment system using the catalytic carbon column 115 in blending tank 110 as described in the embodiment illustrated in FIG. 1. The volume or flow rate of recycled water used to dilute the solids lean effluent may be controlled by the controller 130 to achieve a hydrogen peroxide concentration of less than about 1,000 mg/l (0.1 wt %) in the blending tank 110. In one example, 600 gpm will be recycled from the effluent of the catalytic carbon column 115 through recycle line 160. 30 gpm of treated water will be recycled to the organic destruction reaction tank 135 through recycle line 165 and 570 gpm of treated water will be recycled to upstream of the catalytic carbon column 115, for example, into the blending tank 110 through recycle line 170. During startup when the recirculation loop is empty, dilution water from an external source may be added to the blending tank 110 or other portion of the recycle loop including the reaction tank 135, solids separation unit 150, blending tank 110, catalytic carbon column 115, and associated piping.

In some embodiments, at least a portion of ferric hydroxide separated from the partially treated wastewater in the solids separation unit 150 may be recycled back to the reaction tank 135 through recycle line 175 using an associated pump (not shown) under control of controller 130. This ferric hydroxide recycle may reduce the amount of fresh ferrous salt that might otherwise be introduced into the reaction tank 135 from the source of ferrous salt 140 to maintain a desired concentration of dissolved iron in the reaction tank 135. It has been experimentally observed that after ferrous hydroxide is recycled from the solids separation unit 150 to the reaction tank 135 more than three or four times, it begins to lose effectiveness in supporting the Fenton's reaction in the reaction tank 135. Without being bound to a particular theory, the ferric hydroxide may react over time to form one or more forms of iron oxide or other iron compounds that do not include easily soluble iron. Accordingly, the amount of ferric hydroxide recycled from the solids separation unit 150 to the reaction tank 135 should be balanced with the rate of addition of fresh ferrous salts from the source of ferrous salt 140 to maintain the kinetics of the reaction in the reaction tank at a desirable level and/or to maintain the dissolved iron concentration in the reaction tank 135 within a desired range of, for example, between about two g/l and about six g/l or greater than or equal to about three g/l. In some embodiments, between about 50% and about 100% of the ferric hydroxide generated in the solids separation unit 150 or between about 10 g/l and 30 g/l or between about 15 g/l and about 25 g/l of ferric hydroxide at a flow rate of between about 3 gpm to about 7 gpm is recycled to the reaction tank 135 with the remainder of solids separated from the partially treated wastewater in the solids separation unit 150 discharged from the system 200 for disposal or further treatment through discharge line 180.

In some embodiments, at least a portion of solids lean effluent from the solids separation unit 150 may be recycled back through recycle line 185 using an associated pump (not shown) to the reaction tank 135 as dilution water in addition to or instead of treated water from the catalytic carbon column 115. If sufficient solids lean effluent (for example, 30 gpm) having a low enough hydrogen peroxide concentration to dilute the wastewater entering the reaction tank 135 to a desired level, for example, to 22,000 ppm (2.2 wt %) peroxide or less is available from the solids separation unit 150, it may not be necessary to provide dilution water to the reaction tank 135 from the catalytic carbon column 115. If the solids lean effluent from the solids separation unit 150 has a low enough concentration of peroxide and organic contaminants to be acceptable for discharge to the environment, then solids lean effluent from the solids separation unit 150 not recycled to the reaction tank 135, for example, about 3 gpm of solids lean effluent, may be discharged to the environment through discharge line 190.

If using a sequencing batch reactor (SBR) or a batch treatment tank for reactor 135, the pH in the reactor 135 may be raised to between about 6 and about 8 to precipitate the iron and the iron sludge can be left in the reactor 135 when the treated wastewater is decanted. The pH would then be lowered to between about 1 and about 3 or about 2 to re-dissolve the iron prior to treating the next batch.

As indicated above, a computerized controller 130 may be utilized to control the various pumps P and valves V1, V2 in the various systems 100, 200, 300 disclosed herein (each of the pumps and valves and each connection to controller 130 are not shown in FIG. 2 for ease of illustration) to control or maintain the flow rates, pH, and chemical concentrations in the various system components. Controller 130, may be, for example, a standard computer with appropriate control programming, an application specific integrated circuit (ASIC) or other form of controller known in the art. Controller 130 may be a single component or may include multiple distributed components that may be in communication with each other or with external systems. In some embodiments, measurements of the pH, concentration of the hydrogen peroxide, and/or concentration of dissolved iron in various portions of the system 200 are taken and provided as input to the controller 130, for example, either with periodic samples taken and analyzed by titration or otherwise, or with one or more pH, hydrogen peroxide, and/or dissolved iron sensors S disposed in the reaction tank 135, blending tank 110, solids separation unit 150, or piping or other portion of the system 200.

In another embodiment, instead of using a catalytic carbon column 115 to remove hydrogen peroxide from partially treated wastewater, the concentration of hydrogen peroxide in the influent wastewater from the source of wastewater 105 is reduced to a desired discharge level by chemical reaction in the reaction tank 135. Referring to the example illustrated in FIG. 3, wastewater from the source of wastewater 105 contains 220 g/l (2.2 wt %) $H_2O_2$ and 1 wt % organic contaminants, for example, alcohols, and/or ammonium salts and enters the system at three gpm. The wastewater is diluted to form a diluted wastewater stream using treated water having a lower concentration of hydrogen peroxide and/or organic components than the wastewater from the source of wastewater 105. The treated water may be filtrate from a downstream microfilter, described below. In the reaction tank 135, the diluted wastewater is treated utilizing a Fenton's reaction as disclosed above with reference to the embodiment of FIG. 2. A ferrous salt and an acid are added to the reaction tank 135 from source of ferrous salt 140 and source of acid 145, respectively, to create conditions which will support the formation of hydroxyl free radicals in the reaction tank 135. The pH in the reaction tank 135 may be adjusted or maintained at a pH of between about 1 and about 3 or about 2 by addition of the acid. The concentration of dissolved iron in the reaction tank 135 may be adjusted to or maintained at between about 2 g/l and about 6 g/l or greater than or equal to about 3 g/l by addition of the ferrous salt and/or recycle of ferric hydroxide from a downstream solids separation unit, discussed below. Residence time of diluted wastewater in the reaction tank 135 may be from about 30 minutes to about four hours or about two hours. The ferrous salt may include or consist of, for example, ferrous sulfate. The acid may include or consist of, for example, sulfuric acid.

Figure 3:
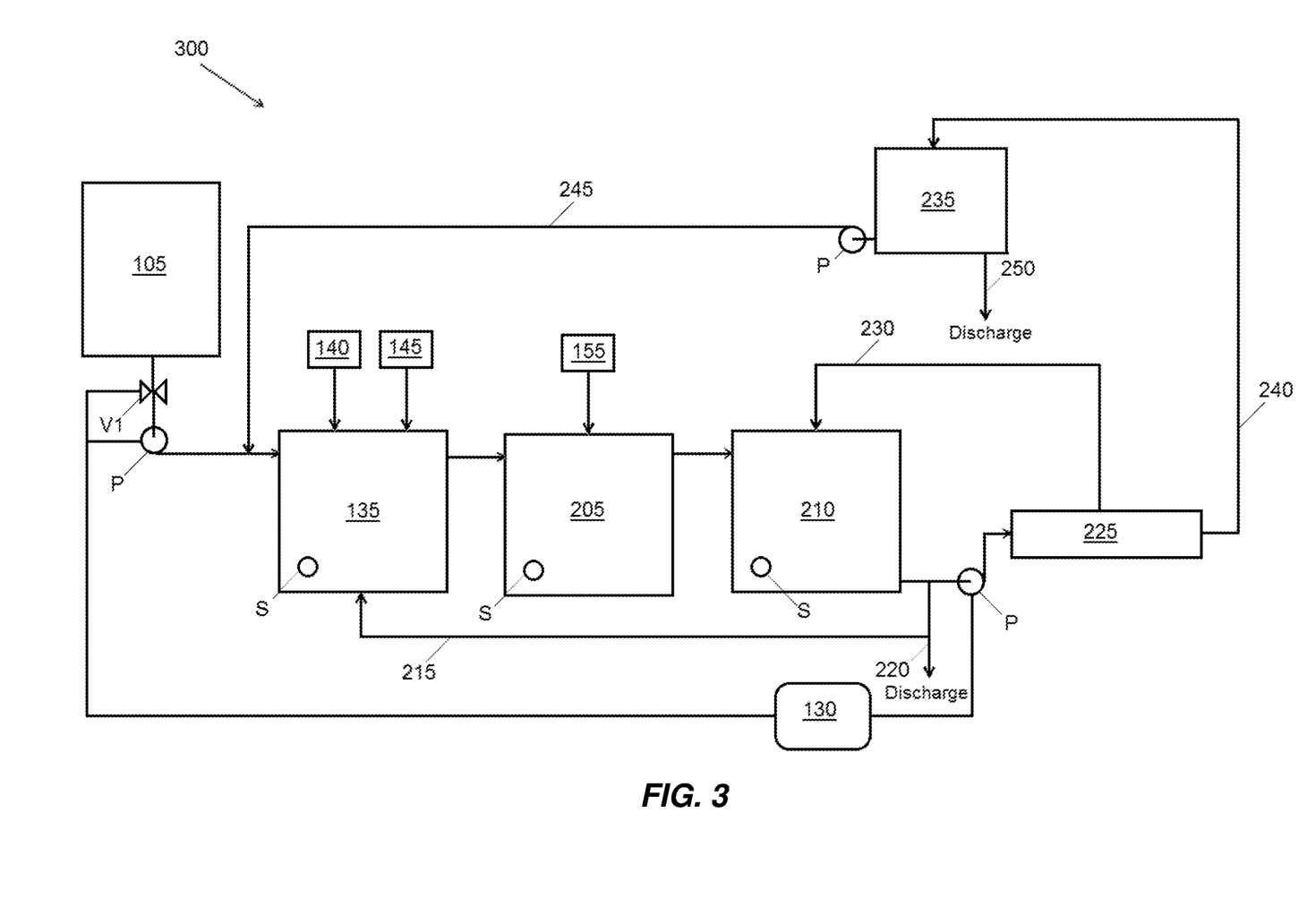
FIG. 3 is a schematic diagram of another embodiment of a system for removing hydrogen peroxide and, optionally, organic contaminants from wastewater.

Partially treated wastewater is pumped or overflows from the reaction tank 135 and enters a pH adjustment tank 205. The pH in the pH adjustment tank 205 is raised to between about 5 and about 8 or to about 6.5 which precipitates iron from the partially treated wastewater. The higher pH will also reduce additional peroxide if some is still remaining in the partially treated wastewater in the pH adjustment tank 205. Residence time of liquid in the pH adjustment tank 205 may be between about 30 minutes and two hours or about one hour.

The pH adjusted or neutralized partially treated wastewater is pumped or overflows from the pH adjustment tank 205 into a microfiltration concentration tank 210 to await filtration through a downstream microfilter 215. The pH adjusted partially treated wastewater in the microfiltration concentration tank 210 may include, for example, between about 15 g/l and about 25 g/l of precipitated iron and from about 3 wt % to about 5 wt % total solids. Ferric hydroxide present in the microfiltration concentration tank 210 may be recycled from the microfiltration concentration tank 210 to the reaction tank 135 via recycle line 215. The amount of ferric hydroxide recycled from the microfiltration concentration tank 210 to the reaction tank 135 should be balanced with the rate of addition of fresh ferrous salts from the source of ferrous salt 140 to maintain the kinetics of the reaction in the reaction tank at a desirable level and/or to maintain the dissolved iron concentration in the reaction tank 135 within a desired range of, for example, between about two g/l and about six g/l or greater than or equal to about three g/l. In some embodiments, between about 50% and about 100% of the ferric hydroxide generated in the solids separation unit 150 or between about 10 g/l and 30 g/l or between about 15 g/l and about 25 g/l of ferric hydroxide at a flow rate of between about 3 gpm to about 7 gpm is recycled to the reaction tank 135 with the remainder of precipitated solids in the microfiltration concentration tank 210 discharged from the system 300 for disposal or further treatment through discharge line 220. At least a portion of the recycled iron will re-dissolve in the reaction tank 135 and can be used in the destruction of peroxide. Residence time of the pH adjusted or neutralized partially treated wastewater in the microfiltration concentration tank 210 may be between about 30 minutes and two hours or about one hour.

Effluent from the microfiltration concentration tank 210 (the solids lean portion of the neutralized partially treated wastewater from which solids have been separated in the microfiltration concentration tank 210) is processed though the microfilter 225. Microfilter 225 may be a membrane filter, a hollow fiber membrane filter, a dead end filter, a cross-flow filter, or any other type of filter known in the art. Microfilter concentrate including solids separated from the effluent from the microfiltration concentration tank 210 by the microfilter 225 may be recycled back to the microfiltration concentration tank 210 via line 230. Filtrate having a lower concentration of contaminants than the microfilter concentrate is directed from a filtrate outlet of the microfilter to a filtrate holding tank 235 via line 240. The filtrate from the microfilter 225 may include less than about 10 mg/l (0.001 wt %) of hydrogen peroxide and may exit the microfilter 225 at a rate of about 33 gpm. A portion of the microfilter filtrate, for example, about 30 gpm, is recycled from the filtrate holding tank 235 back to act as dilution water in the reaction tank 135 if needed to maintain a concentration of hydrogen peroxide entering the reaction tank 135 at a desired level, for example, at 22,000 ppm (2.2 wt %) or less. The remainder of the filtrate, for example, about 3 gpm, can be discharged to the environment via discharge line 250. The provision of the microfiltration concentration tank 210 and the filtrate holding tank 235 may provide for the microfilter 225 to operate only periodically rather than continuously. For example, the microfilter 225 may be operated when the microfiltration concentration tank 210 becomes filled to above a predetermined level and/or when the filtrate holding tank 235 drains to below a predetermined level.

In some embodiments, on startup of the system, clean water may be added directly to the filtrate holding tank 235 or other portion of the system 300 to be used to dilute influent wastewater.

A computerized controller 130 may be utilized to control the various pumps P and valves V1, V2 in the system 300 (each of the pumps and valves and each connection to controller 130 are not shown in FIG. 3 for ease of illustration) to control or maintain the flow rates, pH, and chemical concentrations in the various system components. Controller 130, may be, for example, a standard computer with appropriate control programming, an application specific integrated circuit (ASIC) or other form of controller known in the art. In some embodiments, measurements of the pH, concentration of the hydrogen peroxide, and/or concentration dissolved iron are taken and provided as input to the controller 130, for example, either with periodic samples taken and analyzed by titration or otherwise, or with one or more pH, hydrogen peroxide and/or dissolved iron sensors S disposed in the reaction tank 135, pH adjustment tank 205, microfiltration concentration tank 210, filtrate holding tank 235 or piping or other portion of the system 300.

It should be appreciated that the various flow rates and chemical concentrations described in the above embodiments are only examples, and the flow rates and chemical concentrations may vary based on various factors as desired, for example, the composition of wastewater to be treated, the size of the various tanks and vessels, and desired concentrations of peroxide or other contaminants in water to be discharged from embodiments of the disclosed systems.

Prophetic Example

Example 1

Wastewater with a total organic compound (TOC) content of 7,500 mg/l and a peroxide concentration of 22 wt % was treated. The first step was to dilute the wastewater sample by 10 times (to a peroxide concentration of 2.2 wt %) to prevent a runaway reaction from occurring. Ferrous iron was added to the diluted wastewater sample and the pH adjusted to 2.1. At a dissolved ferrous iron concentration of 1,000 mg/l and a pH of 2.1, the contaminant destruction reaction started slowly and then continued at a relatively steady rate for approximately two hours. At the end of two hours, the TOC had been reduced to approximately 150 mg/l and the peroxide concentration had been reduced to about less than 10 mg/l (0.001 wt %). The reaction increased the temperature of the diluted wastewater sample by about 5 to 6 degrees Celsius. A mild bubbling of the diluted wastewater solution was observed. To complete the reaction, the pH was raised to 6.5 to cause precipitation of ferric hydroxide.

Once the pH of the solution had been raised to 6.5, the iron precipitated out as a form of ferric hydroxide. The precipitate could be recycled back to a reaction tank to be used to initiate additional peroxide destruction. Reuse could be done on a continuous basis where the iron is separated in a clarifier or with the use of a microfilter. The reuse could also be done on a batch basis using a sequencing batch reactor (SBR).

Example 2

Background

A method of treatment of a high peroxide containing wastewater was evaluated. The following shows influent characteristics and effluent targets.

Wastewater Characterization
    Temperature 122° F.
    pH 7 to 9
    1,000 mg/l ammonium salt
    <4 mg/l transition metals
    22% wt % hydrogen peroxide
    0.73% wt % alcohol
    0.73% wt % other organics Final Effluent Quality Targets
    7.3 mg/l (0.00073 wt %) alcohol
    7.3 mg/l (0.00073 wt %) other organics
    2.2 g/l (0.22 wt %) hydrogen peroxide Treatment Utilizing Fenton's Reaction:

The use of Fenton's chemistry to oxidize the organics, followed by pH adjustment and solids separation using either a clarifier or microfilter for removal of residual iron was evaluated. After solids separation, a carbon column would remove hydrogen peroxide. A portion of the column effluent was split three ways. One portion was sent to the front of the system to dilute the raw wastewater peroxide concentration to a level safe for Fenton's chemistry. A second portion was directed to the front of the carbon column to dilute the peroxide to less than 1 g/l (0.1 wt %), which would be considered a safe level to feed to the carbon column. The third portion was discharged.

During the early phases of treatability testing, it was realized that in addition to treatment of the organics, most, if not all of the peroxide could also be successfully treated using Fenton's chemistry. Therefore the use of a carbon column was eliminated from the treatability study.

Most of the jar testing was done on synthetic wastewater. The later stages of jar testing used organic bearing wastewater provided by a semiconductor manufacturer. Treatability testing began with evaluating reaction pH, reaction time, and ferrous sulfate dosages using Fenton's chemistry. Once the conditions for Fenton's chemistry were optimized work was done on recycling the iron oxide waste solids to minimize ferrous sulfate usage.

A design component of the proposed treatment system is to dilute the raw organic bearing wastewater with treated wastewater to limit the hydrogen peroxide in the Fenton's reactor to a maximum of about 2 wt %. Limiting the hydrogen peroxide concentration is important in maintaining a controlled Fenton's reaction and preventing a significant increase in reaction temperature.

A synthetic Fenton's reactor influent was prepared to contain 2 wt % peroxide. Since the raw wastewater design specification was for 22 wt % peroxide it was necessary to dilute all of the raw constituent levels by a factor of 10 to simulate Fenton's reactor influent for jar testing. Laboratory grade chemicals in deionized water were used to prepare the sample for testing. Table 1 below compares the chemical constituents of the raw organic bearing wastewater and the synthetic Fenton's reactor influent.

TABLE 1

Chemical Constituents in Wastewater Design Spec and Fenton Rx Influent

| Parameter | Raw Wastewater Design Specification | Fenton Reactor Influent |
|---|---|---|
| pH (SU) | 7 to 9 | 8 ± 0.5 |
| Hydrogen Peroxide (g/L) | 220 | 22 |
| alcohol (g/L) | 7.3 | 0.73 |
| other organics (g/L) | 7.3 | 0.73 |
| Ammonium Salt (mg/L) | 1.0 | 0.10 |

Analysis of Organic Constituents:

Analysis of the organic compounds was problematic. No laboratory could be found capable of analyzing for the alcohol. The other organics were analyzed by an external testing lab but the standard analytical result turnaround time of two weeks would mean significant delays in testing while waiting for results. Since the treatability lab could do total organic content (TOC) analysis in house and thus provide rapid turnaround time, TOC was used as a surrogate for the organics analysis. When appropriate, periodic samples were sent out for analysis of the organic compounds to confirm results.

The synthetic Fenton's reactor influent contained 750 mg/l TOC by analysis. The theoretical TOC content was 719 mg/l with alcohol contributing 333 mg/l and other organics contributing 386 mg/l. Since the TOC analysis recovered 104% of the theoretical TOC content it proved to be a good surrogate for the organic compounds. The only limitation was that TOC could not differentiate the organic compounds.

Fenton's Treatment with Ferrous Sulfate:

Ferrous sulfate and hydrogen peroxide dosages were calculated prior to conducting the first treatment with Fenton's chemistry using the following steps:
 1. Analyze the chemical oxygen demand (COD) content in the untreated sample
 2. Calculate the hydrogen peroxide dosage
 3. Calculate the iron dosage
 4. Select a reaction pH The COD content is traditionally used as a measurement of the organic content of the sample. Unfortunately, hydrogen peroxide is a known interference with the Hach COD method. Since the sample contained 22 g/L $H_2O_2$ it was necessary to prepare a separate sample without peroxide to obtain an accurate COD analytical result.

A typical peroxide dosage is three times the COD content. The COD in the sample was 2.2 g/L which translates to a peroxide dosage of 6.6 g/l (0.66 wt %) $H_2O_2$. Since the sample already contained 22 g/l (2.2 wt %) $H_2O_2$ no additional peroxide was needed for any of the jar tests described in this report.

Iron dosages can range from 1 part iron per 5 to 25 parts $H_2O_2$. A ratio of 1 part iron to 10 parts $H_2O_2$ was selected for the initial jar test which translated to 0.66 g/l Fe using a peroxide dosage of 6.6 g/l. A ferrous sulfate stock solution was used to provide the necessary iron dose.

One literature source indicated that the optimum pH for Fenton's chemistry can range from pH 3 to pH 6 while other sources cited a narrower range of pH 3 to 4. Consequently a variety of pH targets were evaluated.

A sample of synthetic Fenton's reactor influent was treated as follows:
 1. Stirred sample on paddle mixer during treatment
 2. Added sulfuric acid to pH 4 (Dosage 356 mg/l $H_2SO_4$)
 3. Dosed to 660 mg/l Fe using a ferrous sulfate stock solution
 4. Stirred 80 minutes for Fenton's reaction (pH dropped to 2.3)
 5. Added sodium hydroxide to pH 6.1 (Dosage 1,330 mg/l NaOH)
 6. Stirred 8 minutes then analyzed total suspended solids (TSS) (TSS=1.5 g/L before settling)
 7. Settled 40 minutes
 8. Filtered supernatant through 1.3 micron filter
 9. Analyzed filtrate for $H_2O_2$
 10. Added a slight excess of sodium metabisulfite (dosage 2.3 g/l) to filtrate to remove residual peroxide
 11. Analyzed for TOC, COD, and organic contaminants The treatment worked well as shown by the following analytical results from the filtrate analyses:

| $H_2O_2$ | 820 mg/L (0.082 wt %) |
|---|---|
| TOC | 144 mg/L |
| COD | 144 mg/L |
| Organics | <0.89 mg/L |

The treatment removed 81% of the TOC and 96% of the peroxide.

Verifying Organics Destruction Rather Than Sorption/Presumed Treatment Chemistry:

Prior to proceeding, tests were performed to determine if the organic contaminants were being oxidized rather than sorbed onto the resultant iron hydroxide sludge.

The complete oxidation of organic contaminants by the hydroxyl free radicals generated by Fenton's chemistry would yield nitrate, carbon dioxide, and water as byproducts. Carbon loss through the off gassing of carbon dioxide would be one explanation for the removal of the organic contaminants.

Sorption of organic contaminants onto the iron solids generated post Fenton pH adjustment would also explain the organic contaminants removal. A jar test was conducted to test this mechanism by simulating critical elements of the treatment chemistry.

The Jar test procedure was performed as follows:
 1. Prepared a synthetic solution of 730 mg/l organic contaminants in deionized water
 2. Analyzed TOC (TOC=409 mg/L)
 3. Dosed to 3 g/l Fe with a ferric chloride stock solution
 4. Added sulfuric acid to pH 2
 5. Stirred 15 minutes
 6. Added sodium hydroxide to pH 6.5 to precipitate iron solids (TSS=1.8 g/L)
 7. Stirred 2 hours
 8. Analyzed filtrate for TOC (TOC=412 mg/L)

Sorption of organic contaminants onto the iron solids would result in a loss of soluble TOC. There was no change in soluble TOC therefore no organic contaminants were sorbed onto the iron solids.

The exact reactions taking place are believed to be as follows, however, analysis was not conducted to verify these assumptions.

| | |
|---|---|
| $Fe^{2+} + H_2O_2 \rightarrow Fe^{3+} + OH^- + HO*$ | Generation of free radicals - peroxide and dissolved ferrous iron |
| $Fe^{3+} + H_2O_2 \rightarrow Fe^{2+} + HOO* + H^+$ | Generation of free radicals - peroxide and dissolved ferric iron (pH < 4) |
| $C_xN_yH_z + OH* \rightarrow CO_2 + NO_3 + H_2O$ | Destruction of organics by free radicals |

Effect of Iron Dosage and pH:

A series of three jar tests were done with different iron levels at pH 3.0 to optimize the iron dosage. A fourth jar test was done at pH 5. The procedural steps were not changed from the previous test except that the Fenton's reaction time was 60 minutes and a flocculant was used in these tests to aid in settling.

TABLE 2

Analytical Results and Chemical Dosages

| | Fenton Reaction | | Treated Filtrate | | | Chemical Dosages | | | |
|---|---|---|---|---|---|---|---|---|---|
| Test | Fe Dose (mg/L) | pH (SU) | $H_2O_2$ (mg/L) | TOC (mg/L) | Organics (mg/L) | $FeSO_4$ (mg/L) | $H_2SO_4$ (mg/L) | NaOH (mg/L) | Polymer[1] (mg/L) |
| As Rcd | 0 | 7.6 | 22,000 | 750 | 730 | — | — | — | — |
| 54A | 500 | 3.0 | 9,900 | 217 | <0.50 | 184 | 0 | 1,409 | 1 |
| 54B | 660 | 3.0 | 7,600 | 227 | <0.50 | 242 | 0 | 1,498 | 1 |
| 54C | 1,000 | 3.0 | 4,300 | 176 | <0.50 | 367 | 0 | 1,901 | 1 |
| 54D | 660 | 5.0 | 5,400 | 324 | <0.49 | 242 | 0 | 1,460 | 1 |

[1]Alumafloc I anionic polymer.

Figure 4:
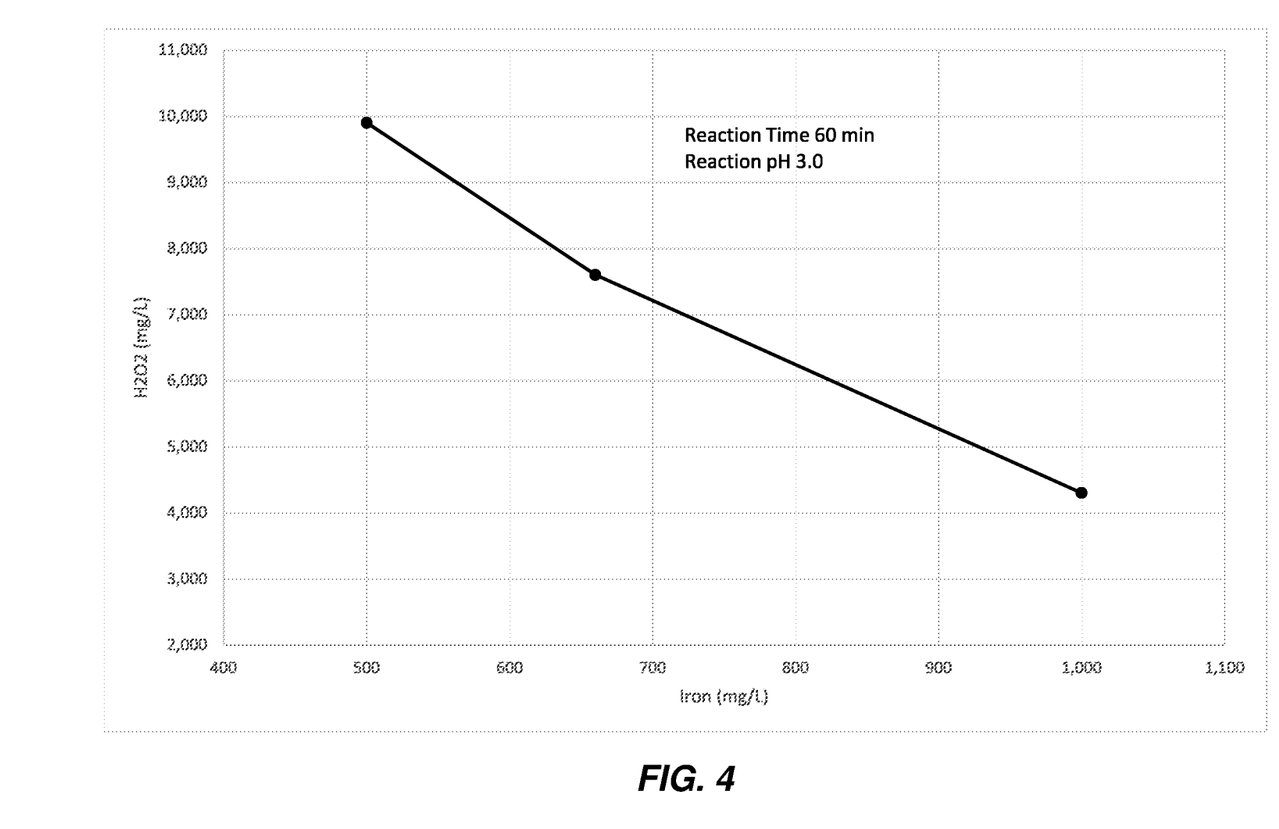
FIG. 4 is a graph of results of a test of a method of removing hydrogen peroxide from water illustrating hydrogen peroxide concentration v. iron concentration after treatment in a reaction vessel.

Conclusions:
1) A 500 mg/L iron dosage removed organic contaminants to less than 0.5 mg/L at both pH 3.0 and 5.0
2) Residual peroxide content is inversely proportional to iron dosage The relationship between residual peroxide and iron dosage is illustrated in FIG. 4.

Conditions for Removal of Hydrogen Peroxide:

The jar tests revealed key relationships between iron dosage and reaction pH that influenced the residual peroxide content. It was thought that it may be possible to eliminate the carbon column from the treatment process by the manipulating the Fenton's chemistry. Consequently, a jar test was devised to evaluate the effect of extended reaction time, high iron dosage, and low pH on residual peroxide content.

The jar test used a ferrous sulfate dosage of 1,000 mg/l Fe and a reaction pH of 2.1. The residual peroxide concentration was measured after a reaction time of 60, 90, and 120 minutes. The results are shown below.

TABLE 3

Reaction Time, Iron Dose and Residual Peroxide

| Iron Dose (mg/L Fe) | RX Time (min) | pH (SU) | $H_2O_2$ (mg/L) | TOC (mg/L) | Organics (mg/L) |
|---|---|---|---|---|---|
| As Rcd | 0 | 7.6 | 22,000 | 760 | 730 |
| 1,000 | 60 | 2.1 | 3,200 | — | — |
| 1,000 | 90 | 2.1 | 340 | — | — |
| 1,000 | 120 | 2.1 | 5 | 121 | <0.36 |

Figure 5:
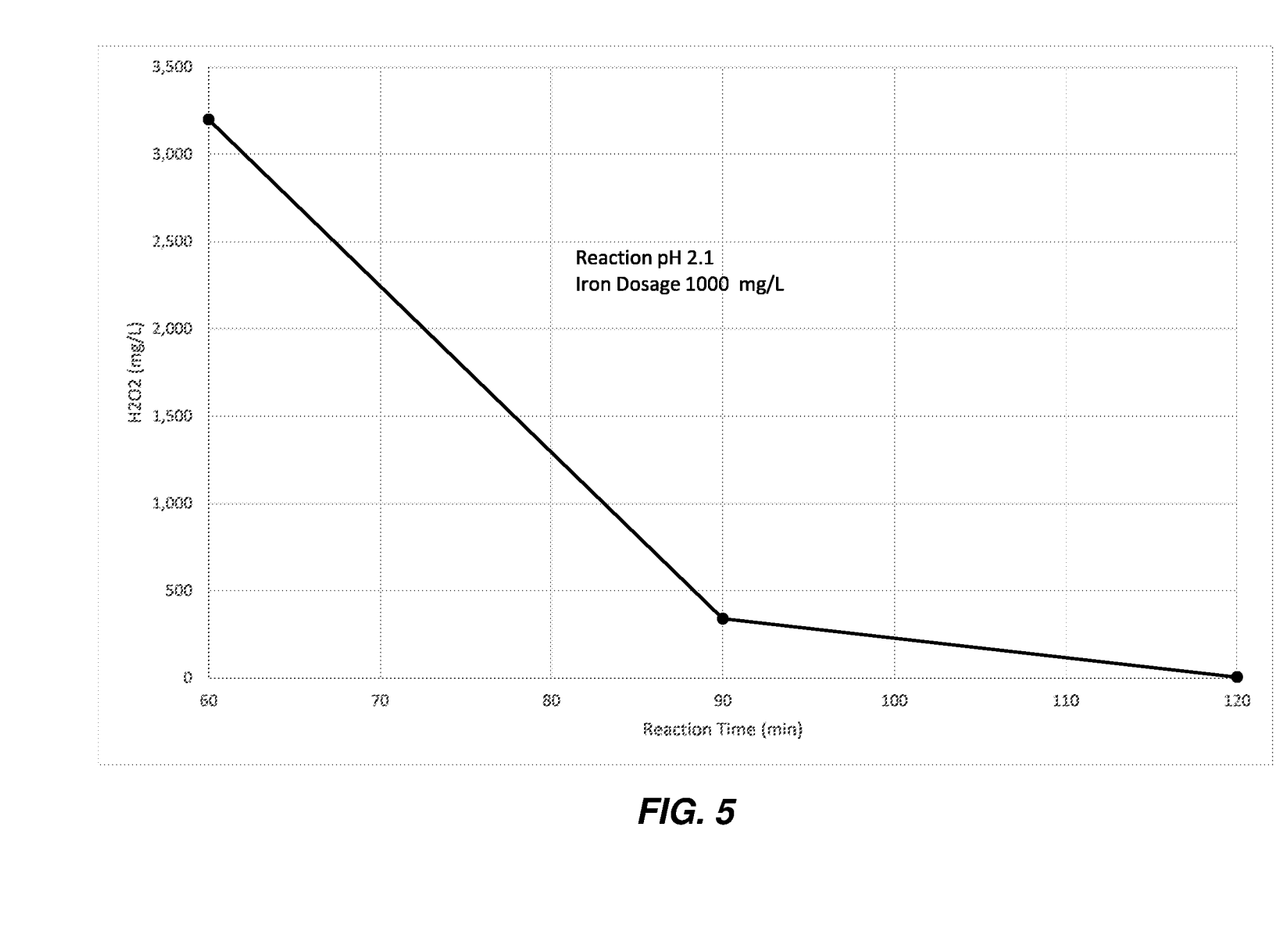
FIG. 5 is a graph of results of a test of another method of removing hydrogen peroxide from water illustrating hydrogen peroxide concentration v. reaction time in a reaction vessel.

The results show that a high dose of iron at low pH and an extended reaction time can not only treat organic contaminants but also hydrogen peroxide. Residual peroxide dose over time is shown in FIG. 5. The results show that a carbon column for peroxide treatment is not necessary if the proper conditions for Fenton's chemistry are applied.

Effect of Lower Iron Dosage:

The results of the testing showed that organic contaminants could be successfully treated with 660 mg/l Fe, pH 5.0, and a 60 minute reaction time. A series of jar tests were done using 100, 300, and 500 mg/l Fe at pH 4.5 to 5.0 and a 60 minute reaction time. No polymer was used in this series of tests. The results, along with the results of test 54D described above are presented in Table 4.

TABLE 4

Analytical Results and Chemical Dosages

| | Fenton Reaction | | Treated Filtrate | | | Chemical Dosages | | |
|---|---|---|---|---|---|---|---|---|
| Test | Fe Dose (mg/L) | pH (SU) | $H_2O_2$ (mg/L) | TOC (mg/L) | Organics (mg/L) | $FeSO_4$ (mg/L) | $H_2SO_4$ (mg/L) | NaOH (mg/L) |
| As Rcd | 0 | 7.6 | 22,000 | 750 | 730 | — | — | — |
| 74A | 100 | 4.5 | 14,600 | 579 | 550 | 242 | 0 | 238 |
| 74B | 300 | 4.5 | 17,600 | 512 | 290 | 367 | 0 | 750 |
| 74C | 500 | 4.5 | 14,600 | 452 | 83 | 242 | 0 | 1,223 |
| 54D | 660 | 5.0 | 5,400 | 324 | <0.49 | 184 | 0 | 1,460 |

Only the 660 mg/l iron dosage removed organic contaminants below the treatment target at pH 4.5 to 5.0 within the 60 minute reaction period. Both the TOC and organic contaminants results show a similar trend of poorer treatment as the iron dosage decreases. Residual peroxide concentrations are high in an four jar tests.

Using Sludge as Iron Source for Fenton's Treatment:

Up to this point soluble iron from ferrous sulfate was used as the iron source for Fenton's treatment. After Fenton's treatment the soluble iron was precipitated by sodium hydroxide addition to pH 6.5 and then the iron bearing solids were removed by filtration. It was thought that these iron bearing solids might be used as an alternative to ferrous sulfate in the Fenton's reaction. Consequently, chemical costs and sludge disposal costs would be significantly reduced.

Treatment Procedure for Treatment with Recovered Fe Solids:
1. Stirred wastewater on paddle mixer during treatment
2. Added sulfuric acid to target pH
3. Added slurry of recycled solids as iron source
4. Added additional acid as needed to maintain target pH
5. Stirred 60 minutes for Fenton's reaction
6. Added sodium hydroxide to pH 6.5
7. Stirred several minutes
8. Filtered supernatant through 1.3 micron filter
9. Analyzed filtrate for $H_2O_2$ and TOC The slurry of iron solids was generated from a previous Fenton's treatment using ferrous sulfate. The solids were allowed to settle, generally overnight, before the supernatant was decanted. The remaining solids were retained for future testing.

Two tests were done with 1.0 g/l Fe from sludge, one test at pH 2.1 and the other test at pH 3.0. In both tests the Fenton's reaction time was 2 hours and the pH was adjusted to pH 6.5 with sodium hydroxide post Fenton's reaction.

TABLE 5

Treatment Using Recycled Sludge - 1,000 mg/L Fe

| Test | Fenton Reaction | | Treated Filtrate[(1)] | | Chemical Dosages | | |
|---|---|---|---|---|---|---|---|
| | Fe Dose (mg/L) | pH (SU) | $H_2O_2$ (mg/L) | TOC (mg/L) | $FeSO_4$ (mg/L) | $H_2SO_4$ (mg/L) | NaOH (mg/L) |
| As Rcd | 0 | 7.6 | 22,000 | 750 | — | — | — |
| 63 | 1,000 | 2.1 | 4,900 | 282 | 0 | 2,050 | 3,500 |
| 65 | 1,000 | 3.0 | 16,300 | 590 | 0 | 547 | 1,336 |

[(1)]The $H_2O_2$ and TOC were analyzed within several minutes of adding NaOH to pH 6.5.

In previous tests treated samples were allowed to stir at pH 6.5 for about 1 hour prior to analysis. In these two tests it was decided to allow only several minutes at pH 6.5 before conducting the analysis since the purpose was primarily initial screening. The peroxide in the pH 2.1 test was also analyzed after standing overnight and had dropped from 4,900 mg/L to 540 mg/l $H_2O_2$.

The Fenton's reaction pH of 2.1 resulted in both a lower residual peroxide and TOC concentration than in the pH 3.0 treatment. However, as expected chemical dosages for sulfuric acid and sodium hydroxide were higher in the pH 2.1 test.

Acidification of Sludge Prior to Dosing:

A test was done to determine if pre-acidifying the sludge slurry to pH 2.0 would increase the amount of soluble iron available for the Fenton's reaction. The Fenton's reaction was also conducted at pH 2.0. The iron must be in soluble form in order to participate in the Fenton's reaction for treatment of organics as well as for the catalytic decomposition of peroxide.

Treatment Procedure with Pre-Acidified Recovered Fe:
1. Adjust pH of solids slurry to 2.0 with sulfuric acid (Dosage 4.27 g/l $H_2SO_4$)
2. Stir 2 hours with paddle mixer
3. Added acidified slurry to synthetic wastewater
4. Added sulfuric acid to pH 2.1 (Dosage 1.09 g/l $H_2SO_4$)
5. Stirred 2 hours for Fenton's reaction
6. Took samples every 30 minutes for soluble iron, TOC, and $H_2O_2$ analyses
7. Added sodium hydroxide to pH 6.5
8. Stirred several minutes
9. Settled overnight
10. Filtered supernatant through 1.3 micron filter
11. Analyzed filtrate for organic contaminants Results:

Even though the iron sludge was stirred for 2 hours prior to dosing the wastewater, the soluble iron continued to increase during the 2 hour Fenton's reaction period. The treated peroxide level was about twice as high as expected based on previous work but the TOC and organic contaminants treated well.

TABLE 6

Results Using Pre-acidified Sludge

| Time (min) | Soluble Iron (mg/L) | $H_2O_2$ (mg/L) | TOC (mg/L) | Organics (mg/L) |
|---|---|---|---|---|
| 0 | — | 20,600 | 750 | 730 |
| 30 | 507 | — | 612 | — |
| 60 | 592 | 12,900 | 534 | — |
| 90 | 626 | 12,500 | 448 | — |
| 120 | — | 11,000 | 340 | <2.6 |

Increased Iron (from Recycled Solids) at pH 2.0:

A jar test was done with an iron dosage of 3.0 g/l at pH 2.0 in an attempt to improve peroxide treatment. The slurry of iron solids was generated from a previous Fenton's treatment using ferrous sulfate. The results showed much improved peroxide removal along with excellent TOC removal.

Soluble iron was measured after a reaction time of 2 hours by filtering the acidic solution (pH 2.0) and found to be only 1,320 mg/l Fe. The iron sludge dosage would have provided 3,000 mg/l soluble iron if the sludge had dissolved completely but only 44% of the total available iron was found to be in soluble form.

TABLE 7

Fenton Reaction at pH 2.0 with 3.0 g/L Fe from Solids

| Fenton Reaction | | Treated Filtrate | |
|---|---|---|---|
| Time (min) | Sol. Fe (mg/L) | $H_2O_2$ (mg/L) | TOC (mg/L) |
| 0 | — | 22,000 | 730 |
| 60 | — | 2,600 | 279 |
| 90 | — | 1,000 | 228 |
| 120 | 1,320 | 100 | 118 |

Fenton's Chemistry with Unstabilized Peroxide:

All previous work was done with the synthetic wastewater prepared with stabilized peroxide. A Fenton's jar test was done with sample prepared using unstabilized peroxide to evaluate the effect on treatment. Testing was conducted at pH 2.0. A dose of 3 g/l iron was used. The iron was "generated" by treating a batch of synthetic wastewater prepared with unstabilized peroxide and then neutralizing the Fenton's treated sample with sodium hydroxide. Reaction times were 2 hours at pH 2 and 1 hour at pH 6.5.

The results in the table below show that the unstabilized peroxide treated similarly to the stabilized peroxide in terms of peroxide and TOC removal. Degradation of peroxide was slightly faster. The soluble iron after a reaction time of 2 hours was 2,000 mg/L which represents 67% of the total iron from the sludge. Note that this level was higher than in the unstabilized peroxide sample.

TABLE 8

Comparison of Treatments Using Stabilized vs. Unstabilized Peroxide

| | Stabilized Peroxide | | | Unstabilized Peroxide | | |
|---|---|---|---|---|---|---|
| Fenton's Reaction | | | Treated Filtrate | Fenton's | | Treated Filtrate |
| Time (min) | Sol. Fe (mg/L) | $H_2O_2$ (mg/L) | TOC (mg/L) | Sol. Fe (mg/L) | $H_2O_2$ (mg/L) | TOC (mg/L) |
| 0 | — | 22,000 | 730 | — | 22,000 | 730 |
| 30 | — | 4,500 | 340 | — | — | — |
| 60 | 1,700 | 1,100 | 263 | — | 2,600 | 279 |
| 90 | 2,000 | 250 | 241 | — | 1,000 | 228 |
| 120 | 2,000 | 58 | 129 | 1,320 | 100 | 118 |

Multiple Sludge Dosing Cycles with Synthetic Wastewater:

A series of tests were done to evaluate sludge recycle through three consecutive treatments. The treatment chemistry is the same as was used above (pH 2, 3 g/l Fe, pH 6.5). The sludge generated in each cycle was used as the iron source for the following cycle.

With each consecutive treatment TOC and peroxide removal becomes less effective as the soluble iron concentration decreases. See the table below for details.

TABLE 9

Treatment of Synthetic Sample Using Multiple Cycles of Sludge Recycle

| | Cycle | | |
|---|---|---|---|
| | 1 | 2 | 3 |
| Post Fenton's Rx Analytical Results | | | |
| TOC (mg/L) | 129 | 270 | 357 |
| $H_2O_2$ (g/L) | 2.0 | 2.2 | 4.9 |
| Fe, soluble (g/L) | 2.0 | 1.7 | 1.2 |
| Chemical Dosages | | | |
| $H_2SO_4$ (g/L) to pH 2.0 | 4.66 | 4.11 | 3.72 |
| NaOH (g/L) to pH 6.5 | 5.26 | 4.65 | 4.34 |

One possible explanation for the declining effectiveness of treatment is the formation of refractory iron oxides in the Fenton's reaction. Recycling the iron sludge results in a continual accumulation of these refractory iron oxides. These compounds do not participate in the generation of hydroxyl free radicals which oxidize organics and do not decompose peroxide.

Treatment of Actual Organic Bearing Wastewater Sample

Two 5 gallon samples of organic bearing wastewater were received from a semiconductor manufacturer. Sludge recycle jar testing was done on the Fenton's reactor influent (diluted sample) prepared from the organic bearing wastewater to validate the treatment process developed from work on the fully synthetic samples.

Table 9 shows analysis of the two undiluted wastewaters (synthetic vs. actual) as well as the diluted samples which were used for jar testing. The hydrogen peroxide content of the raw wastewater determined the dilution factor required prior to the Fenton's reactor. Previous tests safely demonstrated treatment of peroxide up to 22 g/l, therefore the sample was diluted to obtain a peroxide concentration at this level. It is possible that a higher peroxide concentration can be treated safely, however, higher levels were not tested. Deionized water was used for dilution water in the jar tests but the full scale system will use treated filtrate for dilution water.

TABLE 10

Comparison of Chemical Constituents in Untreated Samples

| | Raw Wastewater | | Influent to Fenton Reactor | |
|---|---|---|---|---|
| Parameter | Synthetic | Actual | Synthetic | Actual |
| Dilution factor | none | none | 10x | 4.1x |
| pH (SU) | 7 to 9 | 6.84 | 7.65 | — |
| $H_2O_2$ (g/L) | 220 | 90 | 22 | 22 |
| Alcohol | 7,300 | na | 730 | na |
| Other Organics (mg/L) | 7,300 | 1,600 | 730 | 390 |
| TOC (mg/L) | 7,500 | 1,820 | 750 | 444 |
| Ammonium Salt (mg/L) | 1,000 | 230 | 100 | 56 |

No analytical results are available for the alcohol because no laboratory could be found that provided that service.

Multiple Sludge Dosing Cycles with Organic Bearing Wastewater:

A series of tests with actual organic bearing wastewater was conducted to further investigate the decline in treatment efficiency through repeated cycles of sludge reuse. The initial Fenton's treatment was done at pH 2.0 with 3.0 g/l Fe (using ferrous sulfate). After a 2 hour reaction time, the sample was neutralized with sodium hydroxide, mixed one hour and the solids were settled. The process was then repeated five times using the sludge from the previous test as the iron source (instead of ferrous sulfate).

The table below shows the analytical results following the 2 hour Fenton reaction period before sodium hydroxide addition. TOC and peroxide removal declined after each cycle in similar fashion to previous tests with the fully synthetic wastewater.

The table also shows that soluble iron decreased with each cycle. A total iron analysis was done for each cycle shortly after dosing the sample with sludge. The column labelled "Re-sol. Fe" gives the percentage of total available iron that dissolved as indicated by the soluble iron analysis done at the end of the 2 hour reaction period.

TABLE 11

Treatment Results after Two Hour Fenton Reaction Period

| Cycle | Sol. Fe (mg/L) | Re-sol. Fe (%) | TOC (mg/L) | $H_2O_2$ (mg/L) | Temp. Increase (° F.) |
|---|---|---|---|---|---|
| 0 | NA | NA | 84 | 9 | 28.4 |
| 1 | 2.35 | 84 | 147 | 130 | 9.9 |
| 2 | 1.70 | 74 | 151 | 850 | 10.0 |
| 3 | 1.34 | 63 | 183 | 1,000 | 11.5 |
| 4 | 0.93 | 41 | 253 | 7,480 | 7.2 |
| 5 | 0.81 | 39 | 276 | 9,350 | 3.7 |

Despite the trend of declining treatment efficiency through five cycles the table below shows that the peroxide and organic contaminants were successfully treated in the fifth cycle.

TABLE 12

Chemical Dosages and Final Effluent Quality

| | Chemicals | | Final Effluent | |
|---|---|---|---|---|
| Cycle | $H_2SO_4$ (mg/L) | NaOH (mg/L) | $H_2O_2$ (mg/L) | Organics (mg/L) |
| 0 | 1,483 | 5,857 | NR | NA |
| 1 | 4,941 | 5,906 | 2 | NA |
| 2 | 4,510 | 5,223 | 2 | NA |
| 3 | 3,801 | 4,523 | 9 | NA |
| 4 | 3,117 | 3,936 | 544 | NA |
| 5 | 2,876 | 3,692 | 1,560 | 1.6 |

Treated Wastewater Sample for Further Testing:

The semiconductor manufacturer requested a 1 liter sample of final effluent from the treatment of organic bearing wastewater for testing purposes. The sample was to be representative of the final effluent produced from the proposed full scale treatment system. Ten gallons of organic bearing wastewater was provided by the semiconductor manufacturer for this purpose.

Outline of Treatment Procedure:
  Stage 1—Decompose peroxide in raw organic bearing wastewater to a level that is safe for Fenton's treatment.
  Stage 2—Treat sample from step one to generate treated filtrate.
  Stage 3—Dilute raw organic bearing wastewater with treated filtrate.
  Stage 4—Treat diluted organic bearing wastewater to produce final effluent sample.

Stage 1: Decompose Peroxide in Raw Organic Bearing Wastewater to a Level that is Safe for Fenton's Treatment.

The organic bearing wastewater contained 90 g/L $H_2O_2$ which was too high to treat with Fenton's chemistry in a safe manner. The $H_2O_2$ was lowered to 25 g/L under controlled conditions such that all other constituents in the sample matrix would remain unchanged. The process took about 3 hours.

Procedure:
  1. Warm 3 liters organic bearing wastewater to 84° F. in a hot water bath
  2. Stir vigorously with magnetic stirrer
  3. Add NaOH to pH 9.5 (NaOH dosage 2,600 mg/L)
  4. Continue vigorous stirring while analyzing for $H_2O_2$ periodically at regular intervals
  5. When $H_2O_2$ drops to between 20 to 25 g/L add $H_2SO_4$ to pH 6.5 ($H_2SO_4$ dosage 1,840 mg/L)
  6. Lower temperature to ambient using an ice bath Stage 2: Treat Sample from Step One to Generate Treated Filtrate.

The sample produced from stage 1 was treated with Fenton's chemistry. A two hour reaction time, 3 g/L Fe dose (from a ferric sulfate stock solution), and a reaction pH of 2.0 was used as specified for the full scale system. Note that ferric sulfate was used (instead of ferrous) to better simulate sludge that would be generated during recycle.

Procedure:
  1. 3000 mL organic bearing wastewater from Stage 1
  2. Place beaker in water bath to mitigate increase in temperature
  3. Added $H_2SO_4$ to pH 4.0 (652 mg/L dose)
  4. Dosed to 3.0 g/L $Fe^{3+}$ using $Fe_2(SO_4)_3$ stock solution—the pH dropped to <2
  5. Stirred 80 minutes while maintaining pH 2.0 (required 1,020 mg/L dose of NaOH)
  6. Added NaOH to pH 7.1 (5,300 mg/L dose), stirred 20 minutes, analyzed TSS
  7. Settled 60 minutes
  8. Decanted supernatant and filtered through 1.3 micron filter Stage 3: Dilute Raw Wastewater with Treated Filtrate Combined 488 mL raw organic bearing wastewater with 1024 mL treated filtrate to simulate the influent to the Fenton's reactor. After the 488 mL sludge slurry was added in Stage 4 the effective dilution of the raw organic bearing wastewater was 4.1 x. This generated a feed to the Fenton's reactor containing ~2.2% peroxide.

Stage 4: Treat Diluted Organic Bearing Wastewater to Produce Final Effluent Sample Procedure:
  1. Adjusted pH of diluted organic bearing wastewater from Stage 3 to pH 2.0 with $H_2SO_4$
  2. Added 488 mL sludge slurry while adding $H_2SO_4$ to maintain pH 2.0
  3. Stirred for about 90 minutes while maintaining pH 2.0
  4. Added NaOH to pH 7.1
  5. Stirred 45 minutes
  6. Settled overnight (about 16 hours)
  7. Filtered supernatant through 1.3 micron filter

TABLE 13

Results of Sample Sent to Semiconductor Manufacturer

| | Chemical Dosages | | Analytical Results | | |
|---|---|---|---|---|---|
| Sample | $H_2SO_4$ (mg/L) | NaOH (mg/L) | $H_2O_2$ (mg/L) | TOC (mg/L) | Organics (mg/L) |
| Raw wastewater | 4,450 | 5,410 | 90,000 | 1,820 | 1,600 |
| Final Effluent | — | — | 2 | 157 | — |

Conclusions:

Successful treatment of peroxide and organic compounds can be accomplished using a Fenton's reaction (ferrous sulfate and peroxide). Final peroxide concentrations of less than 2 mg/l and organic contaminant concentrations of less than 0.5 mg/l were achieved in once through treatments (no sludge recycle).

For safety reasons, samples should be diluted to approximately 2.0-2.2 g/L peroxide prior to treatment. It may be possible to treat higher concentrations, but they were not tested. Treated effluent can be used for dilution.

Testing was conducted on samples containing unstabilized peroxide, stabilized peroxide, and on actual organic bearing wastewater samples. Actual organic bearing wastewater samples and samples with unstabilized peroxide reacted somewhat faster and generated slightly more heat. The highest temperature increase seen in any of the tests conducted was 28.4° F. (from 70 to 98.4). This was during the initial treatment of actual organic bearing wastewater using ferrous sulfate as the iron source. Subsequent treatment of this sample resulted temperature increases ranging from 11.5 to 3.7° F.

It was found that the iron hydroxide sludge that is generated during treatment can be recycled to reduce the quantity of chemical needed for treatment and the quantity of sludge generated. However, it was also seen that the effectiveness of the recycled sludge progressively diminishes with each cycle. In a full scale system, it is estimated that sludge will have to be removed every 3-4 cycles and fresh ferrous sulfate will have to be added.

Optimum Fenton's treatment was obtained at a pH of approximately 2.0 and an iron dose of 1,000 mg/l when ferrous sulfate is used. When recycled sludge is used, an iron dose of around 3,000 mg/l is required. A pH of 6.5 is used for neutralization following Fenton's treatment. Reaction times of 2 hours was optimum in the Fenton's reactor and 1 hour in the neutralization reactor.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of a system for reducing a concentration of hydrogen peroxide and/or organic components in water. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve removing dissolved selenium from water. Accordingly the foregoing description and figures are by way of example only. Further the depictions in the figures do not limit the disclosures to the particularly illustrated representations.

While exemplary embodiments are disclosed herein, many modifications, additions, and deletions may be made therein without departing from the spirit and scope of the inventive aspects and their equivalents, as set forth in the following claims.

What is claimed is:

1. A method of reducing a concentration of hydrogen peroxide in wastewater, the method comprising:
   diluting the wastewater to produce a diluted wastewater;
   maintaining the diluted wastewater at a pH between 1 and 3 in a first reaction tank by addition of an acid;
   contacting the diluted wastewater with a dissolved iron compound at the pH between 1 and 3 in the first reaction tank to form a partially treated wastewater having a lower concentration of hydrogen peroxide than the diluted wastewater;
   introducing the partially treated wastewater into a second reaction tank and maintaining a pH of the introduced partially treated wastewater at a pH between 6 and 8 to precipitate iron-containing compounds from the partially treated wastewater thereby forming a neutralized partially treated wastewater; and
   removing residual hydrogen peroxide from the neutralized partially treated wastewater by treating the neutralized partially treated wastewater in a catalytic activated carbon column.

2. The method of claim 1, further comprising utilizing at least a portion of iron-containing compounds precipitated from the partially treated wastewater as a source of the dissolved iron compound.

3. The method of claim 2, further comprising recycling the precipitated iron-containing compounds from the second reaction tank to the first reaction tank.

4. The method of claim 3, wherein diluting the wastewater includes diluting the concentration of hydrogen peroxide in wastewater to less than about 2.2 wt % prior to introducing the diluted wastewater into the first reaction tank.

5. The method of claim 4, wherein the diluted wastewater has a peroxide concentration of between 2.0-2.2 g/L.

6. The method of claim 1, further comprising diluting the wastewater with solids lean effluent from the second reaction tank.

7. The method of claim 6, wherein diluting the wastewater includes diluting the concentration of hydrogen peroxide in the wastewater to less than about 2.2 wt % prior to introducing the diluted wastewater into the first reaction tank.

8. The method of claim 1, further comprising:
   introducing the neutralized partially treated wastewater into a microfilter concentration tank; and
   periodically filtering a portion of the neutralized partially treated wastewater from the microfilter concentration tank through a microfilter.

9. The method of claim 8, further comprising recycling microfilter concentrate separated from the neutralized partially treated wastewater by the microfilter to the microfilter concentration tank.

10. The method of claim 8, further comprising diluting the wastewater with a portion of filtrate produced from the neutralized partially treated wastewater in the microfilter.

11. The method of claim 1, wherein the diluting comprises diluting a wastewater having a peroxide concentration of about 22 wt. %.

12. A system for removing hydrogen peroxide from wastewater, the system comprising:
a first reaction tank having an inlet fluidly connectable to a source of the wastewater;
a source of dilution water having a lower concentration of hydrogen peroxide than the wastewater in fluid communication with the inlet of the first reaction tank;
a source of ferrous salt in fluid communication with the first reaction tank;
a source of acid in fluid communication with the first reaction tank;
a second reaction tank having an inlet in fluid communication with an outlet of the first reaction tank;
a source of a base in fluid communication with the second reaction tank; and
a controller configured to cause the system to perform a method comprising:
diluting the wastewater to produce a diluted wastewater;
maintaining the diluted wastewater at a pH between 1 and 3 in a first reaction tank by addition of an acid;
contacting the diluted wastewater with a dissolved iron compound at the pH between 1 and 3 in the first reaction tank to form a partially treated wastewater having a lower concentration of hydrogen peroxide than the diluted wastewater; and
introducing the partially treated wastewater into a second reaction tank and maintaining a pH of the introduced partially treated wastewater at a pH between 6 and 8 to precipitate iron-containing compounds from the partially treated wastewater thereby forming a neutralized partially treated wastewater.

13. The system of claim 12, further comprising a recycling system configured to recycle iron containing compounds from the second reaction tank to the first reaction tank.

14. The system of claim 12, further comprising a water recycling system configured to recycle solids lean effluent from the second reaction tank to the inlet of the first reaction tank, the solids lean effluent forming at least a portion of the dilution water.

15. The system of claim 12, further comprising a microfilter concentration tank having an inlet in fluid communication with an outlet of the second reaction tank.

16. The system of claim 15, further comprising a solids/liquid separation unit having an inlet in fluid communication with an outlet of the microfilter concentration tank.

17. The system of claim 16, further comprising a concentrate recycle system configured to recycle solids separated from the neutralized partially treated wastewater in the solids/liquid separation unit to the microfilter concentration tank.

18. The system of claim 16, further comprising a filtrate recycle system configured to recycle filtrate formed from the neutralized partially treated wastewater in the solids/liquid separation unit to the inlet of the first reaction tank.

19. The system of claim 18, further comprising a filtrate holding tank in fluid communication between the solids/liquid separation unit and the inlet of the first reaction tank, the filtrate holding tank including a first outlet in fluid communication with the first reaction tank and a second outlet in fluid communication with a discharge stream that discharges liquid from the system.

20. A method of reducing a concentration of hydrogen peroxide in wastewater, the method comprising:
diluting the wastewater to produce a diluted wastewater;
maintaining the diluted wastewater at a pH between 1 and 3 in a first reaction tank by addition of an acid;
contacting the diluted wastewater with a dissolved iron compound at the pH between 1 and 3 in the first reaction tank to form a partially treated wastewater having a lower concentration of hydrogen peroxide than the diluted wastewater;
introducing the partially treated wastewater into a second reaction tank and maintaining a pH of the introduced partially treated wastewater at a pH between 6 and 8 to precipitate iron-containing compounds from the partially treated wastewater thereby forming a neutralized partially treated wastewater; and
recycling a portion of the precipitated iron-containing compounds from the neutralized partially treated wastewater into the diluted wastewater, the precipitated iron compounds comprising ferric hydroxide.

21. The method of claim 20, further comprising:
introducing the neutralized partially treated wastewater into a microfilter concentration tank; and
periodically filtering a portion of the neutralized partially treated wastewater from the microfilter concentration tank through a microfilter.

22. The method of claim 21, further comprising diluting the wastewater with a portion of filtrate produced from the neutralized partially treated wastewater in the microfilter.

23. A method of reducing a concentration of hydrogen peroxide in wastewater, the method comprising:
diluting the wastewater to produce a diluted wastewater;
maintaining the diluted wastewater at a pH between 1 and 3 in a first reaction tank by addition of an acid;
contacting the diluted wastewater with a dissolved iron compound at the pH between 1 and 3 in the first reaction tank to form a partially treated wastewater having a lower concentration of hydrogen peroxide than the diluted wastewater;
introducing the partially treated wastewater into a second reaction tank and maintaining a pH of the introduced partially treated wastewater at a pH between 6 and 8 to precipitate iron-containing compounds from the partially treated wastewater thereby forming a neutralized partially treated wastewater; and
diluting the neutralized partially treated wastewater to form a diluted neutralized partially treated wastewater; and
removing residual hydrogen peroxide from the diluted neutralized partially treated wastewater by treating the diluted neutralized partially treated wastewater in a catalytic activated carbon column to form a treated water.

* * * * *